Jan. 2, 1923.
C. MINZNER.
ATTACHMENT FOR FUEL BURNERS.
FILED OCT. 27, 1921.
1,440,483
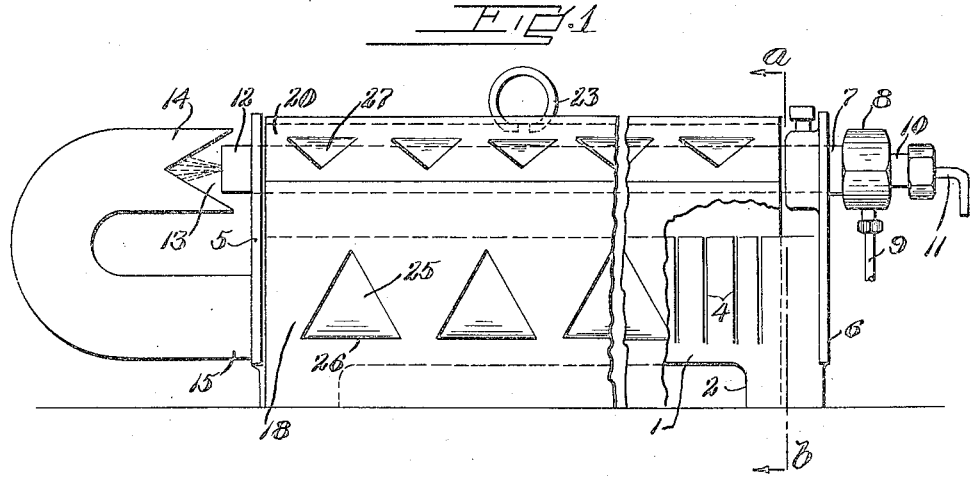
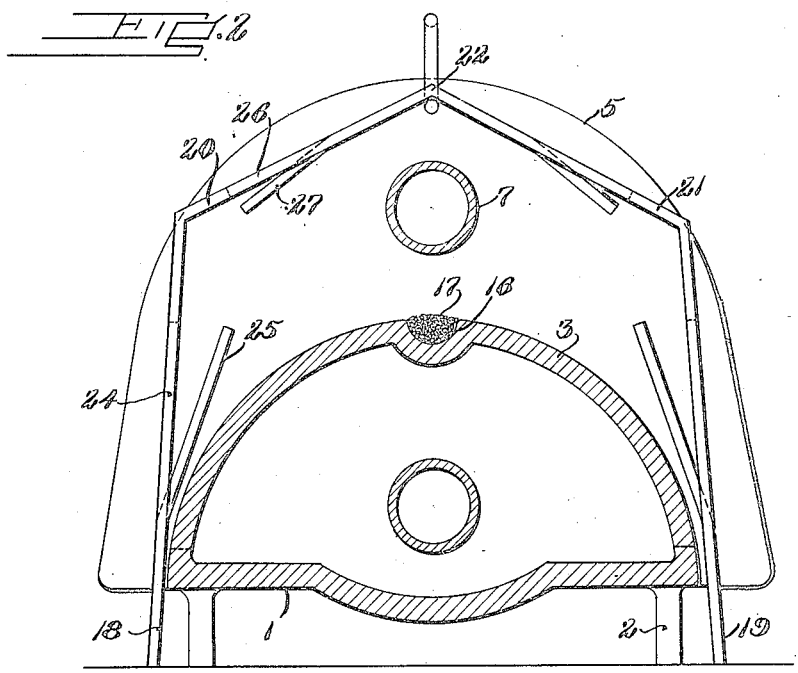
Inventor:
Charles Minzner,
By Roberts, Roberts & Cushman
his attys Patented Jan. 2, 1923.

1,440,483

UNITED STATES PATENT OFFICE.

CHARLES MINZNER, OF LACONIA, NEW HAMPSHIRE.

ATTACHMENT FOR FUEL BURNERS.

Application filed October 27, 1921. Serial No. 510,857.

*To all whom it may concern:*

Be it known that I, CHARLES MINZNER, a citizen of the United States, and resident of Laconia, in the county of Belknap and State of New Hampshire, have invented new and useful Improvements in Attachments for Fuel Burners, of which the following is a specification.

This invention concerns heat generating appliances of that type wherein liquid fuel is converted into vapor or gas by the action of heat and is then consumed in a suitable burner, the present invention relating more particularly to means useful in connection with such an appliance for insuring a more perfect combustion of the vaporized fuel under certain conditions of operation.

In devices of the general type to which the present invention relates it is common to employ a so-called "generator" exposed to the heat of the flame from the burner and through which the liquid fuel is passed for vaporization, and for initially heating this generator a suitable torch is provided. This torch usually consists of a piece of absorbent material saturated with alcohol or the like and burns only long enough to heat the generator in starting. After the torch has ceased to burn and before the burner parts have become fully heated, the fuel which escapes near the upper part of the burner and adjacent to the more highly heated parts of the same is ignited by contact with such highly heated part or by the burner flame. That portion of the fuel, however, which flows from the lower part of the burner often fails to ignite, as the temperature of the lower part of the burner is insufficient to fire the gas by contact therewith, while moreover the passage of the preheated and vaporized fuel through the relatively cooler parts of the burner may cause a partial condensation of the fuel, which with the unconsumed vapor escapes into the room, producing a disagreeable odor and forms an oily deposit upon articles within the room. When the burner is partially shut off, the lower portions thereof become so cool as to fail to ignite the gas issuing therefrom, with similar results.

The object of the present invention is to provide means whereby a thorough and complete ignition of the gas issuing from the burner orifices may be assured both when starting up the burner and when it has been partially shut off. The invention accordingly consists in providing a removable cover or deflecting shield which may be placed over the burner or generator whereby to provide a chamber of limited dimensions within which is confined the heat from the torch flame. The gas escaping from the lower part of the burner is thereby compelled to flow toward the upper and hotter part of the same and is there heated and ignited, so that unconsumed gas or vapor is not discharged from the apparatus. The shield or deflector may be of sheet metal and provided with a handle or other device whereby to permit its removal from the burner when the latter has become heated sufficiently to insure ignition of gas issuing from all parts of the same, and preferably such shield is formed with guarded openings for the escape of the products of combustion.

In the accompanying drawings there is illustrated by way of example one embodiment of means whereby this object may be attained, and in which,—

Fig. 1 is a fragmentary side elevation of a heater having the device of the present invention applied thereto, such device being partly broken away to show the heater structure; and Fig. 2 is a transverse cross section on the line $a$—$b$ of Fig. 1 to larger scale.

In the drawings the numeral 1 indicates the elongate hollow burner casting of the heater, such casting having suitable legs 2 whereby it may be supported when in use. This casting has a substantially semi-circular wall 3 provided with vertical slits or orifices 4. These slits extend from one side to the other of the burner casting and across the top thereof and provide for the escape of the gaseous fuel from the interior of the casting. At its opposite ends the casting 1 is provided with upstanding flanges 5, 6, respectively, such flanges being provided at their upper portions with alined openings wherein is supported the tubular member 7 within which the gaseous fuel is generated and which is hereinafter referred to as the "generator." To one end of the generator 7 is connected a coupling device 8 to which is secured the end of the fuel pipe 9. This pipe may lead to any suitable source of liquid fuel and such fuel may be caused to flow through the pipe and into the generator by gravity or pressure as desired. The connection 8 is provided with a bushing 10 through which extends the shank 11 of a suitable needle valve which controls an orifice in the opposite end 12 of the generator. This orifice delivers into the open end 13 of a tube 14 which is bent upon itself to provide the part 15 which extends into the interior of the burner casing. At its upper portion the burner casing is provided with a depression or trough 16 in which is arranged absorbent material 17 such as asbestos which when soaked with alcohol or similar inflammable material may serve as a torch for initially heating the generator. The specific heater device thus far described is substantially like that shown in the patent to Evans 1,292,739, January 28, 1919 and forms no necessary part of the invention.

Cooperating with the burner and generator just described and in accordance with the present invention, there is provided a cover or shield comprising the spaced side walls 18, 19 which converge upwardly toward each other. These side walls are of a length to substantially fill the space between the end flanges 5, 6 of the heater. At their upper edges, the side walls are connected to the inclined top walls 20, 21 respectively, such top walls being united along the line 22. While the various wall members 18, 19, 20, 21 may be formed as separate elements suitably connected, it is preferred to form them of an integral strip of metal as herein disclosed, such metal being bent at the proper points to provide wall members having the desired angular relation. At a point preferably central of the length of this cover device, a ring or handle 23 is provided, such ring being secured in suitable openings in the top wall members adjacent to the line of union of the same. This ring serves as a convenient means whereby the cover may be lifted from off the burner when desired.

While the device is useful without perforations therein, it is preferred to form perforations or openings such as 24 in the side wall members 18 and 19. These perforations may be formed by stamping the sheet metal of which the cover is constructed whereby to provide the tongues 25 of substantially triangular form, these tongues being integrally united at their lower edges 26 to the metal of the cover but being separated therefrom along their other edges. The tongues as thus provided are deflected inwardly, as indicated in Fig. 2, and while permitting the products of combustion to escape from within the cover, serve as guards for the openings whereby the direct passage of gaseous material is obstructed. In the same way it is preferred to provide openings 26 in the top members 20 and 21 respectively, and to furnish such openings with guard tongues 27 inclined downwardly and inwardly as indicated in Fig. 2, such guard tongues being formed integrally with the metal of the cover.

In starting a burner of the type herein shown, it is first necessary to ignite the torch 17 whereby to heat the generator 7 and when such generator has become heated, the liquid fuel is permitted to flow into the same through the pipe 9. If the generator and torch are entirely unenclosed, as is usual, the flame from the torch is frequently blown aside by drafts of air. In accordance with the present invention, after the torch has been lighted, the cover device is placed over the heater, such cover being supported upon the lower edges of the walls 18, 19. In this position the torch flame is protected from drafts so that the full heat thereof is available for heating the generator.

It is also noticeable during the starting up of the heater and before the burner parts have become hot enough to cause ignition of gas issuing from the slots 4 that some of the gas, and particularly that issuing from the lower parts of said slots, escapes from the heater without being ignited. When, however, the cover device herein disclosed is employed, such gas or vapor as may escape from the lower parts of the burner slots is constrained to move upwardly and inwardly into the upper part of the cover where it necessarily comes into contact with the flame of the previously ignited gas. The combustion of the entire quantity of gas issuing from the burner slots is thus assured so that the disagreeable odor commonly noticed in starting up a burner of this type is entirely eliminated. When the burner parts have become sufficiently heated to insure ignition of the gas issuing from the lower parts of the slots, the cover may then be removed and laid aside. The cover is also useful when the burner is turned down to such an extent that the lower parts of the burner casing decrease in temperature below the ignition point of the gas. In such cases the cover may be applied and by deflecting the gas inwardly toward the hotter parts of the burner provides for the ignition of the same.

While the cover device has been shown as having angularly disposed sides it is contemplated that results of a similar character might be secured by employing a cover having a somewhat different configuration and it is contemplated that various changes in the shape and relative arrangement of parts may well be made without substantially modifying the mode of use of the device or departing from the spirit of the invention as set forth herein.

I claim:

1. In combination with a heater of the type having a generator and a torch disposed below said generator for initially heating the same, a removable shield therefor comprising a sheet metal device having angularly disposed portions constructed and arranged to depend respectively upon opposite sides of said generator and torch whereby to provide an enclosure therefor.

2. A cover device of the class described comprising oppositely disposed, spaced wall members, said members having openings therein, and means for guarding said openings.

3. A deflector device for use with burners, comprising converging wall members, said members being provided with openings therein, and guard tongues extending upwardly from the lower edges of said openings, said tongues being deflected inwardly relatively to the planes of the respective wall members.

4. A deflector device for use with a burner, comprising a sheet metal member having a triangular opening therein, the base of the opening being substantially horizontal, and an integral triangular tongue extending upwardly from the lower edge of said opening and diverging from the plane of said member.

5. A device of the class described comprising relatively inclined side walls, and top walls integrally united to the respective side walls and to each other, each of said walls being provided with guarded openings.

6. A shield device for use with gaseous fuel burners comprising relatively inclined side walls, top wall members for closing the spaces between the upper edges of the side walls, and a ring secured to said top wall members whereby the device may be lifted.

7. In combination with an elongate burner of substantially semicircular cross section having vertically disposed slits for the emission of gaseous fuel, a temporary cover device comprising an integral sheet of metal comprising wall members disposable upon opposite sides of the burner and closely adjacent thereto, said members being upwardly convergent, and means uniting said walls at their upper portions and a handle for lifting the cover device from the burner.

8. In combination with a burner device having vertically disposed slits for the emission of gaseous fuel, a removable deflector device comprising a wall member constructed and arranged to deflect fuel issuing from the lower part of such slits upwardly and inwardly toward the upper part of the burner, said device having a handle for lifting it from the burner.

9. In combination with a heating appliance comprising an elongate burner of substantially semicircular cross section having a series of vertically disposed orifice slits extending transversely from side to side thereof, a generator above the central portion of said burner, and a torch device below the generator, a removable sheet metal closure for said heating appliance, comprising spaced upwardly converging side walls, top wall members united to said side walls and to each other, and means whereby said closure member may be lifted from off said heating appliance.

Signed by me at Laconia, N. H., this 22 day of October, 1921.

CHARLES MINZNER.